(12) United States Patent
Gomi et al.

(10) Patent No.: US 11,265,030 B2
(45) Date of Patent: Mar. 1, 2022

(54) ELECTRONIC APPARATUS, AND METHOD

(71) Applicant: KABUSHIKI KAISHA TOSHIBA, Tokyo (JP)

(72) Inventors: Koichiro Gomi, Kanagawa (JP); Tomomi Aoki, Kanagawa (JP); Keiichi Yamaguchi, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/010,867

(22) Filed: Sep. 3, 2020

(65) Prior Publication Data

US 2021/0105033 A1 Apr. 8, 2021

(30) Foreign Application Priority Data

Oct. 7, 2019 (JP) .............................. JP2019-184277

(51) Int. Cl.
*H04B 1/10* (2006.01)
*H04B 1/12* (2006.01)

(52) U.S. Cl.
CPC ............. *H04B 1/1027* (2013.01); *H04B 1/12* (2013.01)

(58) Field of Classification Search
CPC ................................ H04B 1/1027; H04B 1/12
See application file for complete search history.

(56) References Cited

U.S. PATENT DOCUMENTS

| | | | | |
|---|---|---|---|---|
| 10,805,936 B1* | 10/2020 | Uln | ...................... | H04W 72/082 |
| 2004/0171352 A1* | 9/2004 | Maeda | ...................... | H04B 1/10 |
| | | | | 455/67.13 |
| 2014/0369450 A1* | 12/2014 | Leyh | ...................... | H04B 1/109 |
| | | | | 375/346 |
| 2017/0104506 A1* | 4/2017 | Liu | ......................... | H04L 27/26 |
| 2018/0145709 A1* | 5/2018 | Kushioka | ................. | H04B 1/10 |

FOREIGN PATENT DOCUMENTS

| | | |
|---|---|---|
| JP | 6367160 B2 | 8/2018 |
| JP | 2019-219315 A | 12/2019 |

\* cited by examiner

*Primary Examiner* — Dac V Ha
(74) *Attorney, Agent, or Firm* — Finnegan, Henderson, Farabow, Garrett & Dunner L.L.P.

(57) ABSTRACT

An object to be achieved by an embodiment of the present invention is to provide a radar apparatus, a signal processing apparatus, and a method that reduce interference caused to a reception signal by a transmission signal during transmission of a signal. To achieve the above object, a radar apparatus of an embodiment includes: a transmitter configured to transmit a pulse signal; a receiver configured to receive a reception signal including a first signal as the pulse signal reflected by an observation target and an interference signal provided in accordance with the pulse signal; and a processor configured to generate a separated signal in which the reception signal is, on a time axis, separated into a first component corresponding to the first signal and an interference component corresponding to the interference signal by using a first reference signal generated based on the pulse signal and reduce the interference component.

16 Claims, 12 Drawing Sheets

ELECTRONIC APPARATUS, AND METHOD

CROSS-REFERENCE TO RELATED APPLICATION (S)

This application is based upon and claims the benefit of priority from Japanese Patent Application No. 2019-184277, filed Oct. 7, 2019; the entire contents of which are incorporated herein by reference.

FIELD

Embodiments described herein relate generally to an electronic apparatus, and a method.

BACKGROUND

A simultaneous transmit and receive (STAR) technique has been studied in which reception of a signal is possible during transmission of a signal. In a case where reception of a signal is performed during transmission of a signal, a signal to be transmitted may interfere with a signal to be received. A STAR technique is demanded which reduces this interference. As a method for reducing the interference, there is a method in which a replica signal of a transmission signal is generated and the replica signal is subtracted from a reception signal.

DETAILED DESCRIPTION

Figure 1:
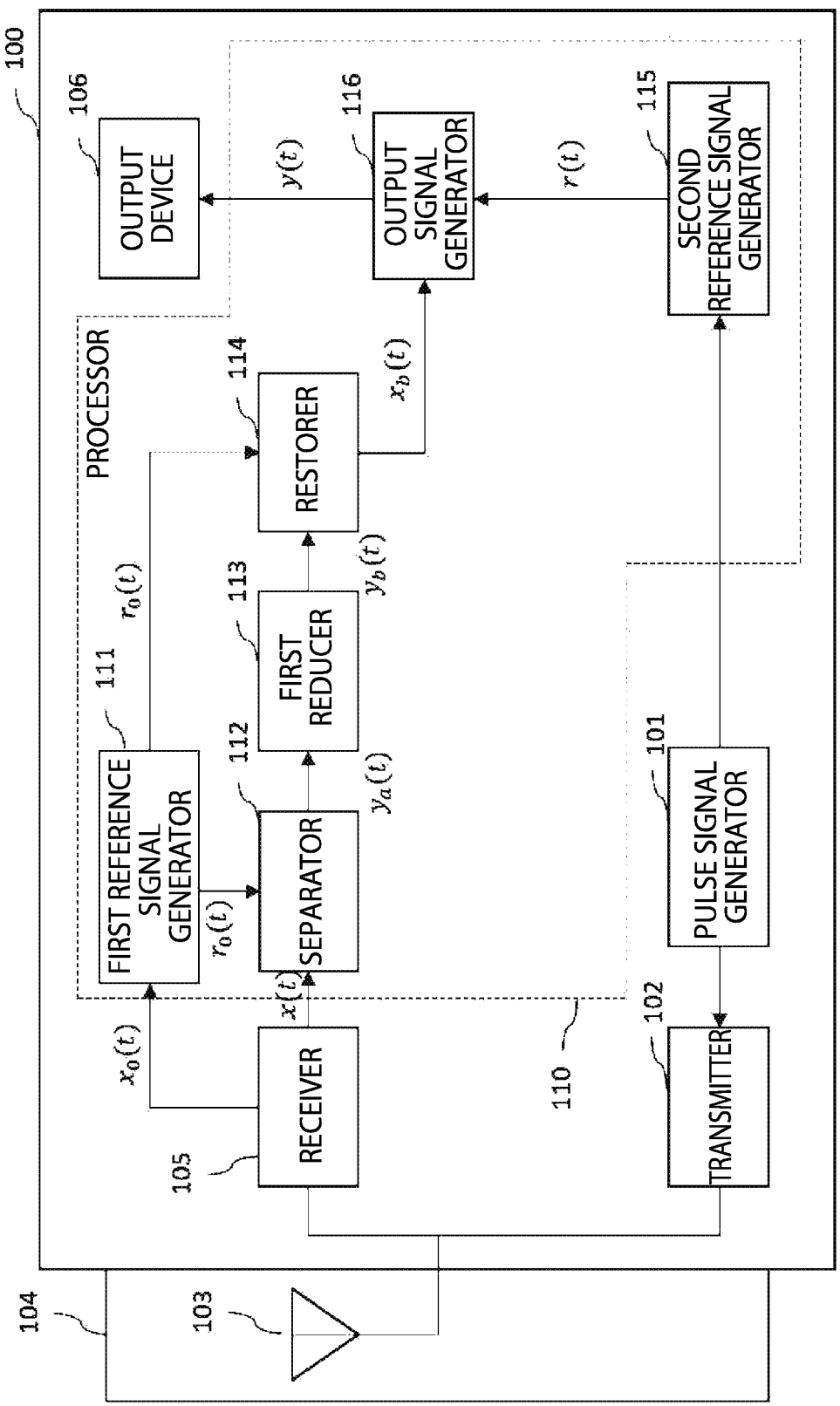
FIG. 1 is a configuration diagram illustrating a radar apparatus in a first embodiment.

An object to be achieved by an embodiment of the present invention is to provide a radar apparatus, a signal processing apparatus, and a method that reduce interference caused to a reception signal by a transmission signal during transmission of a signal.

To achieve the above object, a radar apparatus of an embodiment includes: a transmitter configured to transmit a pulse signal; a receiver configured to receive a reception signal including a first signal as the pulse signal reflected by an observation target and an interference signal provided in accordance with the pulse signal; and a processor configured to generate a separated signal in which the reception signal is, on a time axis, separated into a first component corresponding to the first signal and an interference component corresponding to the interference signal by using a first reference signal generated based on the pulse signal and reduce the interference component.

Embodiments for carrying out the invention will hereinafter be described with reference to drawings. The disclosure is merely one example, and the invention is not limited by contents described in the following embodiments. Modifications that may easily be conceived by a person having ordinary skill in the art are of course included in the scope of the disclosure. In order to make description clearer, the drawings may be schematically illustrated by changing the size, shape, and so forth of each portion from those of actual embodiments. In plural drawings, the same reference numerals may be given to corresponding elements, and a detailed description thereof may be omitted.

First Embodiment

FIG. 1 illustrates a configuration of a radar apparatus 100 in this embodiment. The radar apparatus 100 is a radar apparatus configured to perform simultaneous transmit and receive (STAR), the radar apparatus being capable of receiving a signal B from the outside during transmission of a signal A by the radar apparatus 100 itself. In a case where reception of the signal B is performed during transmission of the signal A, the signal A to be transmitted (hereinafter also referred to as "transmission signal") may interfere with the signal B to be received (hereinafter also referred to as "reception signal").

A reception signal of the radar apparatus 100 includes a pulse signal being a target of reception and reflected by an observation target (hereinafter also referred to as "desired signal") and an interference signal to become interference. The interference signal includes a component due to the pulse signal itself transmitted by the radar apparatus 100. The radar apparatus 100 generates a separated signal in which the reception signal including the interference signal is separated into a component corresponding to the desired signal (hereinafter also referred to as "desired component") and a component corresponding to the interference signal (hereinafter also referred to as "interference component"). The radar apparatus 100 performs data correction to the separated signal and thereby removes and reduces the interference component. Accordingly, the radar apparatus 100 of this embodiment does not use a replica signal as related art but may more largely reduce the interference component than a method using the replica signal.

The radar apparatus 100 includes a pulse signal generator 101, a transmitter 102, an antenna 103, a radome 104, a receiver 105, an output device 106, and a processor 110. The processor 110 includes a first reference signal generator 111, a separator 112, a first reducer 113, a restorer 114, a second reference signal generator 115, and an output signal generator 116.

The pulse signal generator 101 generates a pulse signal. The pulse signal is used for transmission by the transmitter 102 and is also used for generation of a signal used for generation of an output signal in the second reference signal generator 115 (hereinafter also referred to as "second reference signal"). Further, an interference signal based on the pulse signal is used for generation of a signal used in separation of the reception signal into the desired component and the interference component in the first reference signal generator 111 (hereinafter also referred to as "first reference signal"). The interference signal based on the pulse signal will be described later.

The transmitter 102 transmits the pulse signal sent from the pulse signal generator 101 through the antenna 103. The antenna 103 radiates the pulse signal sent from the transmitter 102 so as to cover an observation target region. The radiated pulse signal is reflected by an observation target in the observation target region. The antenna 103 is used for reception of the reception signal by the receiver 105. The reception signal includes the pulse signal reflected by the observation target as the desired signal. The observation target is a cloud, rain, or the like, for example. A protector 104 is a structure protecting the antenna 103. For example, the protector 104 is a radome and protects the antenna 103 from wind, rain, snow, and so forth.

The receiver 105 receives the reception signal through the antenna 103 and sends the reception signal as digital data to the separator 112. In FIG. 1, the reception signal is denoted as "x(t)". The receiver 105 receives the interference signal based on the pulse signal and sends the interference signal as digital data to the first reference signal generator 111. The interference signal based on the pulse signal is an interference signal caused due to the pulse signal itself. Examples of the interference signal based on the pulse signal may include a signal resulting from a pulse signal generated by the pulse signal generator 101 and passing via an analog circuit such as the transmitter 102 or the receiver 105, a pulse signal sent to the receiver 105 in a case where the antenna 103 is terminated, and a signal reflected by the protector 104 and received by the receiver 105.

The interference signal based on the pulse signal is used for generation of the first reference signal in the first reference signal generator 111. In FIG. 1, the interference signal based on the pulse signal is denoted as "$x_0(t)$". The interference signal based on the pulse signal is a signal resulting from a pulse signal generated by the pulse signal generator 101 and sneaking in an internal portion of the radar apparatus 100. For example, the reception signal obtained by transmitting the pulse signal in a case where no object reflecting the pulse signal is present in the observation target region corresponds to the interference signal based on the pulse signal. Further, the reception signal obtained by reflection of the transmitted pulse signal by the protector 104 also corresponds to the interference signal based on the pulse signal. Further, the reception signal obtained from the transmitter 102 via the terminated antenna 103 in a case where the antenna 103 is terminated also corresponds to the interference signal based on the pulse signal. In this embodiment, as one example, it is assumed that the interference signal based on the pulse signal is the pulse signal sent to the receiver 105 in a case where the antenna 103 is terminated and is acquired in advance. In a case where the first reference signal is generated, the receiver 105 sends the received interference signal based on the pulse signal to the first reference signal generator 111. The receiver 105 sends the reception signal to the separator 112 in a case where the interference component is reduced.

The first reference signal generator 111 generates in advance the first reference signal from the interference signal based on the pulse signal, the interference signal being sent from the receiver 105, and sends the first reference signal to the separator 112. The first reference signal is a signal that is based on the interference signal based on the pulse signal, is used for signal processing, and may thereby separate the reception signal into the desired component and the interference component. In FIG. 1, the first reference signal is denoted as "$r_0(t)$". Note that in this embodiment, as one example, generation of the first reference signal is performed in advance before the reception signal is delivered.

The separator 112 uses the first reference signal sent from the first reference signal generator 111 and thereby generates the separated signal in which the reception signal x(t) is separated into the desired component and the interference component. Pulse compression is used in separation of the signal. Pulse compression and a separation method of the interference signal will be described later. In the separated signal, the desired component and the interference component are separated from each other on a time axis. In FIG. 1, the separated signal is denoted as "$y_a(t)$".

The first reducer 113 reduces the interference component of the separated signal sent from the separator 112. Specifically, the first reducer 113 corrects data expressed as the interference component and thereby reduces the interference component. This data correction will be described later. The first reducer 113 sends the separated signal in which the interference component is reduced to the restorer 114. The separated signal in which the interference component is reduced is used for restoration of a signal in the restorer 114. In FIG. 1, the separated signal in which the interference component is reduced is denoted as "$y_b(t)$".

The restorer 114 uses the first reference signal sent from the first reference signal generator 111 and thereby restores a signal including the desired signal from the separated signal which is sent from the first reducer 113 and in which the interference component is reduced. This signal will also be referred to as "restored signal". The restored signal includes the desired signal, and the interference signal is reduced compared to the reception signal. Restoration of such a signal subjected to pulse compression to a signal not yet subjected to pulse compression is herein referred to as "pulse decompression". After the interference component is reduced in the first reducer 113, the restorer 114 generates the restored signal, and degradation of the S/N ratio of a signal may thereby be inhibited. In FIG. 1, the restored signal is denoted as "$x_b(t)$".

The second reference signal generator 115 generates the second reference signal based on the pulse signal sent from the pulse signal generator 101 and sends the second reference signal to the output signal generator 116. The second reference signal is used for generation of the output signal in the output signal generator 116. In FIG. 1, the second reference signal is denoted as "r(t)".

The output signal generator 116 uses the second reference signal sent from the second reference signal generator 115 and thereby generates the output signal from the restored signal sent from the restorer 114. Specifically, the output signal generator 116 performs pulse compression using the second reference signal for the restored signal and thereby generates the output signal. The output signal generator 116 sends the output signal to the output device 106. In FIG. 1, the output signal is denoted as "y(t)". The output signal is a signal in a pulse compression state and includes data expressing the desired component. For example, the output signal is sent to a data analysis apparatus connected with the radar apparatus 100.

The output device 106 outputs the output signal sent from the output signal generator 116. An output destination and a form of the output signal are arbitrarily set, and the output destination may be an apparatus analyzing data included in the output signal, an apparatus performing visual display, a storage, or the like, for example. Those apparatuses may be non-illustrated elements in the internal portion of the radar apparatus 100 or may be provided on the outside of the radar apparatus 100. The form of the output signal is expressed by a predetermined data format.

At least a portion of the above-described first reference signal generator 111, separator 112, first reducer 113, restorer 114, second reference signal generator 115, and output signal generator 116 are realized by the processor 110. The processor 110 is an electronic circuit including a control apparatus and a computation apparatus. Possible examples of the electronic circuit may include a general purpose processor, a central processing unit (CPU), a microprocessor, a digital signal processor (DSP), an ASIC, an FPGA, and combinations thereof.

In the above, the constituent elements of the radar apparatus 100 are described. Connection among the constituent elements may be made in a wired or wireless manner. Further, the constituent elements of the radar apparatus 100 may be collectively mounted on one chip, or a portion of the constituent elements may be mounted on another chip.

Figure 2A:
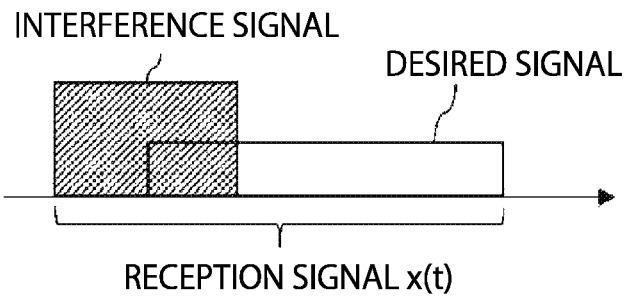
FIGS. 2A to 2D are diagrams explaining signals from reception of a reception signal to generation of a restored signal.

The reception signal, the separated signal, reduction of the interference component in the separated signal, and the restored signal will be described by using FIGS. 2A to 2D and mathematical formulas. FIGS. 2A to 2D are diagrams schematically illustrating a situation in which the reception signal is changed by signal processing to the separated signal, the separated signal in which the interference component is reduced, and the restored signal. As illustrated in FIG. 2A, the reception signal (x(t)) includes the interference signal and the desired signal. The interference signal overlaps with a portion of the desired signal and causes interference. The interference signal includes interference due to the pulse signal transmitted by the transmitter 102 and is thus received earlier than the desired signal reflected by the observation target. Consequently, in the reception signal, a portion having the interference signal as a main signal, a portion in which the interference signal and the desired signal are mixedly present, and a portion having the desired signal as a main signal are present on the time axis. In order to enhance precision of separation of the interference signal and the desired signal, a predetermined length is needed as a data length included in the reception signal. In this embodiment, as one example, it is assumed that the data length included in the reception signal is two times or longer the data length included in the pulse signal to be transmitted. When the data length included in the reception signal is two times or longer the data length included in the pulse signal to be transmitted, such a data length may cover the whole necessary desired signal in observation during transmission of the pulse signal.

Figure 2B:
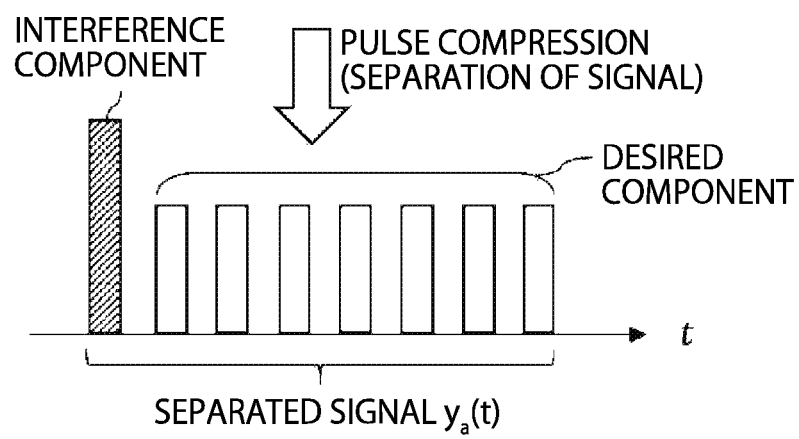

As illustrated in FIG. 2B, the reception signal becomes the separated signal ($y_a(t)$) in which the interference component and the desired component are separated from each other by pulse compression using the first reference signal. The first reference signal ($r_0(t)$) is generated from the interference signal ($x_0(t)$) based on the pulse signal in the first reference signal generator 111. The first reference signal is expressed by a formula (1).

[Math. 1]

$$r_0(t) = \mathcal{F}^{-1}(1/X_0^*(f)) \quad (1)$$

here, $$X_0^*(f) = [\mathcal{F}(x_0(t))]^* \quad \text{[Math. 2]}$$

and $$\mathcal{F} \quad \text{[Math. 3]}$$

represents Fourier transform. That is, the first reference signal ($r_0(t)$) is obtained by performing Fourier transform of the interference signal based on the pulse signal, obtaining the reciprocal of the complex conjugate of the result of this Fourier transform, and performing inverse Fourier transform of this reciprocal. The first reference signal ($r_0(t)$) is a signal that separates the reception signal into the interference component and the desired component.

A signal ($y_0(t)$) in a case where pulse compression using the first reference signal is performed for the interference signal ($x_0(t)$) based on the pulse signal is expressed by a formula (2). A process of the following formula (2) is also referred to as "pulse compression".

[Math. 4]

$$y_0(t) = \int_{-\infty}^{\infty} X_0(f) \cdot R_0^*(f) e^{i2\pi f t} df \quad (2)$$
$$= \int_{-\infty}^{\infty} X_0(f) \cdot \frac{1}{X_0(f)} e^{i2\pi f t} df = \delta(t)$$

here,

[Math. 5]

$$R_0^*(f) = [\mathcal{F}(r_0(t))]^*$$

and

[Math. 6]

$$\delta(t)$$

represents a delta function. Based on the formula (2), the signal $y_0(t)$ becomes a signal having the interference component included in the interference signal ($x_0(t)$) based on the pulse signal at "t=0". As described above, a signal in which the interference component is concentrated to a predetermined time point is also referred to as "a signal integrated in an impulse manner". The formula (1) is one example of the first reference signal in this embodiment, and the first reference signal may arbitrarily be set as long as the signal $y_0(t)$ becomes a signal in which the interference component included in the interference signal ($x_0(t)$) based on the pulse signal is integrated in an impulse manner at "t=0". For example, the first reference signal may be a Gaussian function or the like. Note that a criterion of "t" may be arbitrarily set, and in this embodiment, as one example, it is assumed that "t=0" is a time point at which the transmitter 102 transmits the pulse signal. That is, pulse compression is performed by using the first reference signal, and a signal may thereby be generated in which the interference component included in the interference signal ($x_0(t)$) based on the pulse signal is integrated in an impulse manner at "t=0".

The reception signal (x(t)) includes the desired signal and the interference signal. As expressed by the formula (2), by performing pulse compression, it becomes possible to gather the interference component included in the interference signal to "t=0". In this case, because the interference component is not included in time after "t=0" or is so small that the interference component is dealt with as an error, the desired component and the interference component are separated from each other on the time axis. In a case where pulse compression is performed for the reception signal (x(t)) by using the first reference signal ($r_0(t)$) expressed by the formula (1), the separated signal ($y_a(t)$) in which the desired component and the interference component are separated from each other on the time axis is expressed by a formula (3).

[Math. 7]

$$y_a(t)=\int_{-\infty}^{\infty} X(f) \cdot R_0^*(f) e^{i2\pi ft} df \qquad (3)$$

and $$X(f)=\mathcal{F}(x(t)) \qquad \text{[Math. 8]}$$

FIG. 2B illustrates a diagram of the separated signal ($y_a(t)$). The interference component and the desired component are arranged at time widths preset by the separator 112. The interference component and desired component illustrated in FIG. 2B are expressed as arrays of numbers (data). Each element of the arranged arrays is also referred to as "bin". The interference component and the desired component are represented while being separated on the time axis. That is, a bin of the interference component and bins of the desired component are present at different time points, and the bin of the interference component is arranged earlier on the time axis than the bins of the desired component. Note that those bins represent bins at distances from the radar apparatus 100, and a later bin on the time axis represents a bin of a more distant observation target from the radar apparatus 100.

Figure 2C:
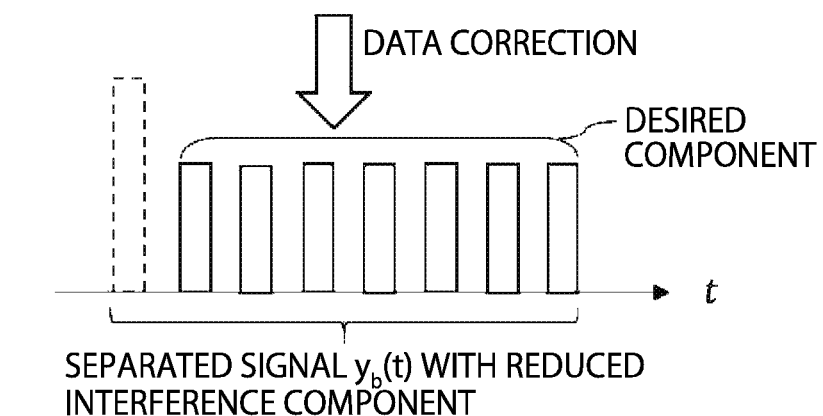
Figure 2D:
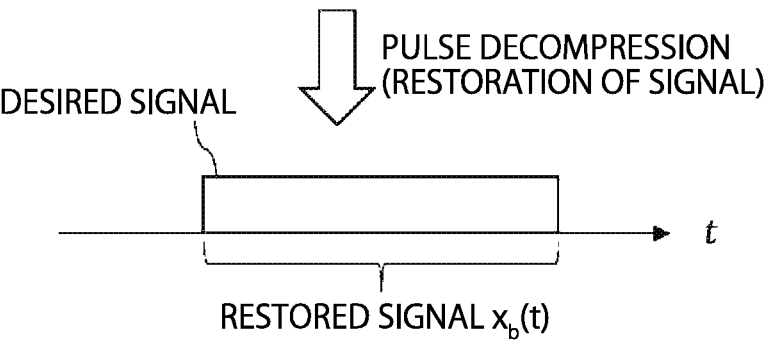

Reduction of the interference component in the separated signal is illustrated in FIG. 2C. Because the interference component is separated on the time axis in the separated signal ($y_a(t)$), the interference component is reduced by correcting the value of data represented as the interference component. Although the value of data may be arbitrarily corrected, the value of data is reduced in a range preset by the radar apparatus 100. For example, among the bins of the separated signal, the value of the bin of the interference component is rewritten to a minimum value (including a quasi-minimum value) preset by the first reducer 113, a noise level, zero, or the like. Accordingly, the separated signal becomes the separated signal ($y_b(t)$) in which the interference component is reduced.

The separated signal ($y_b(t)$) in which the interference component is reduced is restored to the restored signal ($x_b(t)$) including the desired signal by using the first reference signal. Because the restored signal is restored from the separated signal in which the interference component is reduced, the restored signal becomes a signal in which the interference signal included in the reception signal is reduced. The restored signal ($x_b(t)$) is expressed by the following formula (4). A process of the following formula (4) is referred to as "pulse decompression".

[Math. 9]

$$x_b(t)=\int_{-\infty}^{\infty} Y_b(f)/R_0^*(f) e^{i2\pi ft} df \qquad (4)$$

and $$Y_b(f)=\mathcal{F}(t_b(t)) \qquad \text{[Math. 10]}$$

That is, the restored signal ($x_b(t)$) is generated by performing Fourier transform of the separated signal in which the interference component is reduced, multiplying the result of this Fourier transform by the reciprocal of the complex conjugate of the result of Fourier transform of the first reference signal, and performing inverse Fourier transform of the result of this multiplication. The output signal (y(t)) is generated from the restored signal ($x_b(t)$) by using the second reference signal. The second reference signal is used for the restored signal, and an output signal may thereby be obtained in which degradation of the S/N ratio is inhibited. The output signal (y(t)) is expressed by the following formula (5). A process of the following formula (5) is also referred to as "pulse compression".

[Math. 11]

$$y(t)=\int_{-\infty}^{\infty} X_b(f) \cdot R^*(f) e^{i2\pi ft} df \qquad (5)$$

and $$X_b(f)=\mathcal{F}(x_b(t)) \qquad \text{[Math. 12]}$$

Figure 3:
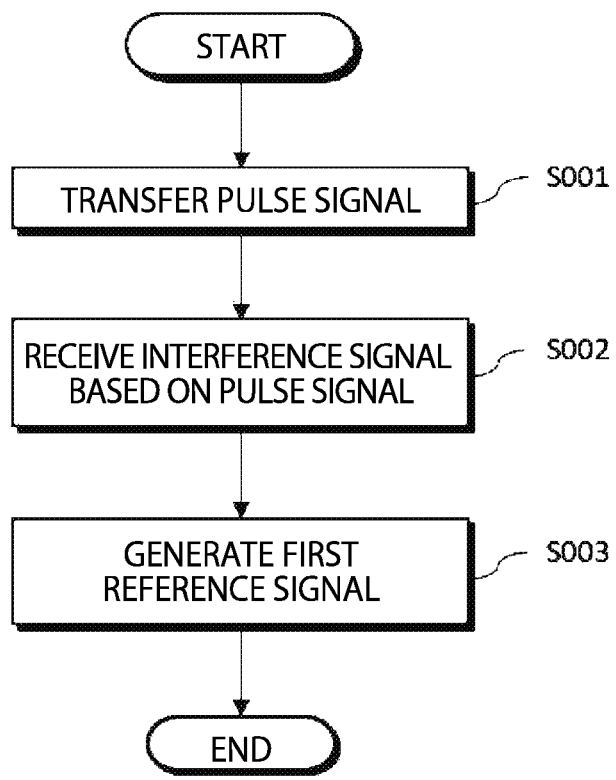
FIG. 3 is a flowchart of generation of a first reference signal by the radar apparatus in the first embodiment.
Figure 4:
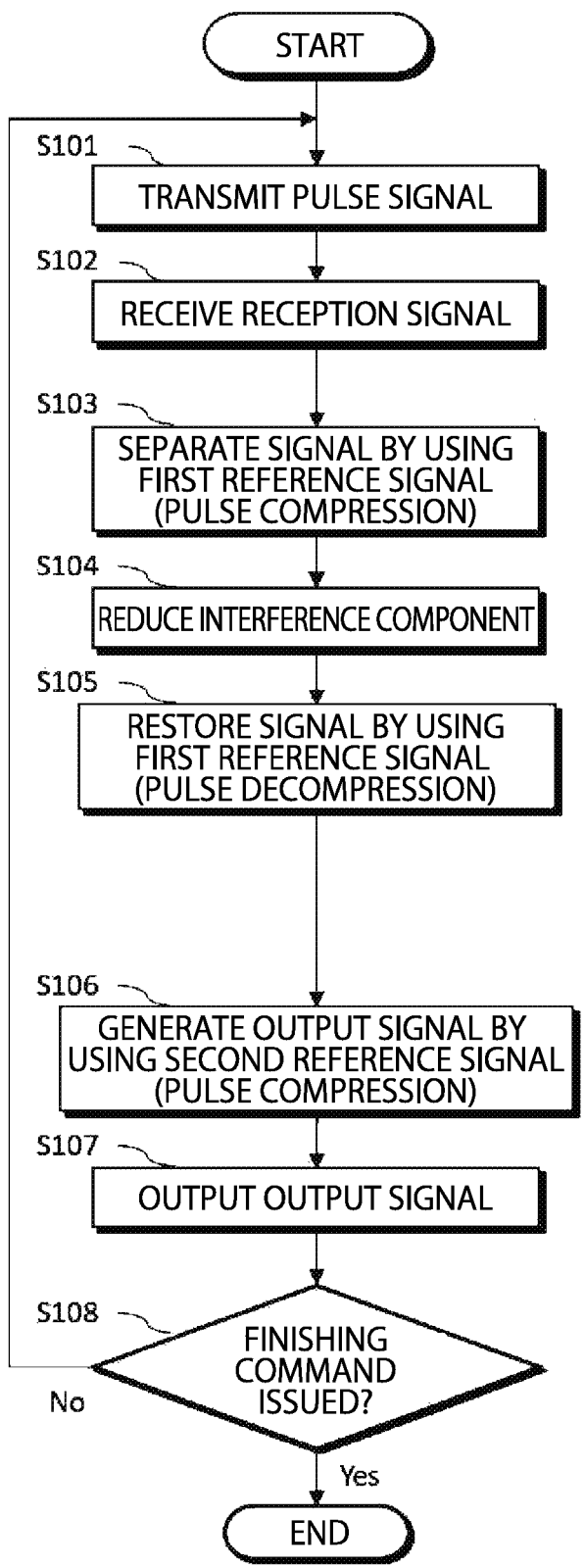
FIG. 4 is a flowchart of the radar apparatus in the first embodiment.
Figure 5:
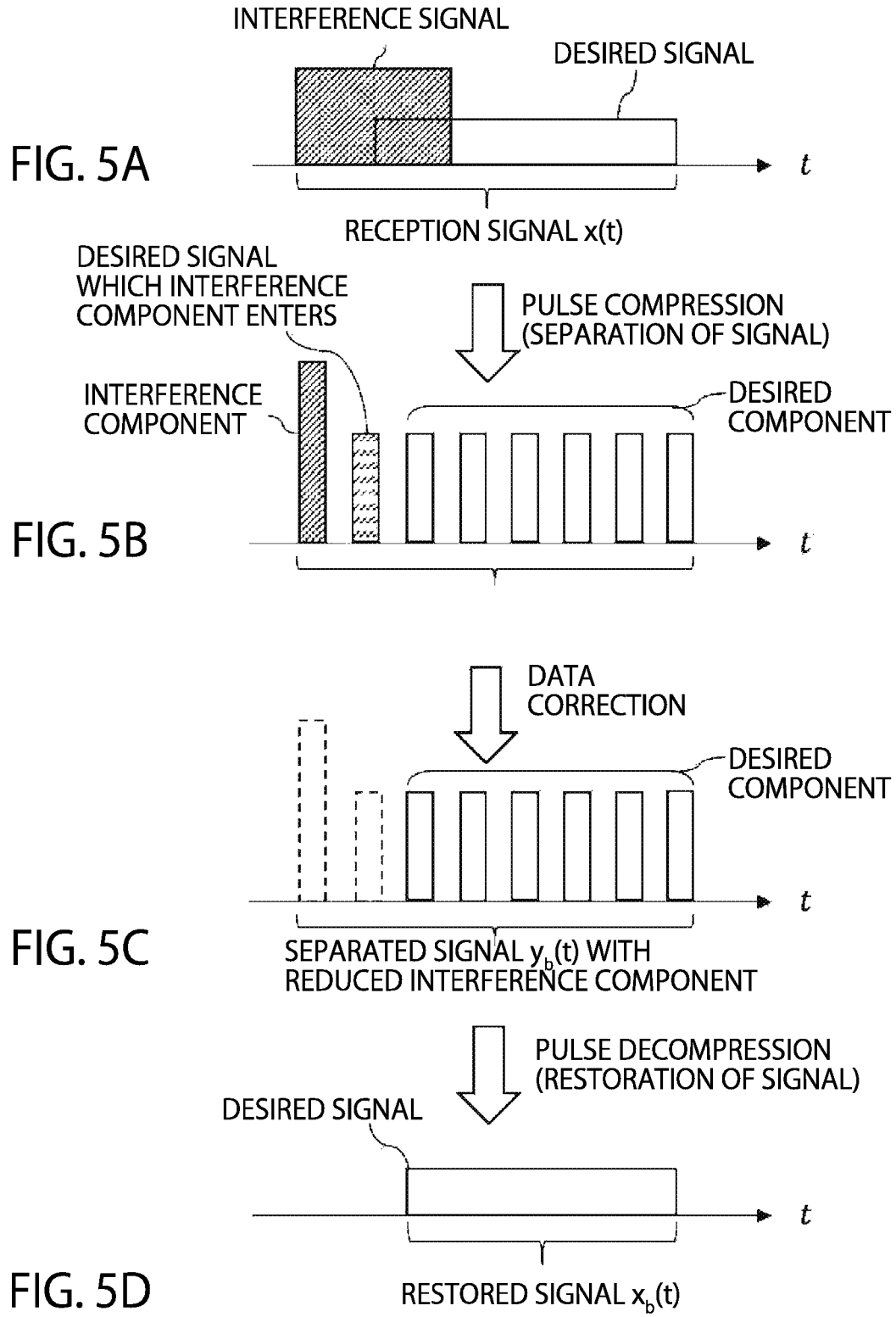
FIGS. 5A to 5D are diagrams explaining signals from reception of the reception signal to generation of the restored signal in a modification example of the first embodiment.

In the above, the signal processing performed from the reception signal to the output signal is described by using FIGS. 2A to 2D and the mathematical formulas. In the following, an action of the radar apparatus 100 in the signal processing will be described by using FIG. 3 and FIG. 4. The radar apparatus 100 generates in advance the first reference signal before receiving the reception signal. First, a description will be made about the action of the radar apparatus 100 in generation of the first reference signal. In this embodiment, it is assumed that in a case where the radar apparatus 100 generates the first reference signal, the antenna 103 is terminated.

The pulse signal generator 101 generates the pulse signal, and the transmitter 102 transfers the pulse signal to the antenna 103 (step S001). Because the antenna 103 is terminated, the transferred pulse signal is received by the receiver 105 as the interference signal based on the pulse signal (step S002). The receiver 105 sends the interference signal based on the pulse signal as digital data to the first reference signal generator 111. The first reference signal generator 111 generates the first reference signal from the sent interference signal based on the pulse signal (step S003). The first reference signal generator 111 sends the generated first reference signal to the separator 112 and the restorer 114. The first reference signal is used for generation of the restored signal by pulse compression of the reception signal in the separator 112 and pulse decompression in the restorer 114.

In the above, a description is made about generation of the first reference signal in the first reference signal generator 111. In the following, a description will be made by using FIG. 4 about the action of the radar apparatus 100 from transmission of the pulse signal and reception of the reception signal to output of the output signal. Note that in the following description, it is assumed that the antenna 103 is not terminated.

The pulse signal generator 101 generates the pulse signal, and the transmitter 102 transmits the pulse signal through the antenna 103 (step S101). The pulse signal generated by the pulse signal generator 101 is a preset pulse signal and is capable of being arbitrarily set. The pulse signal generator 101 sends the pulse signal also to the second reference signal generator 115. The second reference signal generator 115 generates the second reference signal based on the pulse signal and sends the second reference signal to the output signal generator 116.

The receiver 105 receives the reception signal (step S102). The reception signal includes the pulse signal reflected by the observation target (desired signal) and the interference signal. The receiver 105 sends the reception signal to the separator 112.

The separator 112 uses the first reference signal sent in advance from the first reference signal generator 111 to separate the reception signal and generates the separated signal (step S103). The separated signal includes the desired component and the interference component that are separated from each other on the time axis. Specifically, the separator 112 applies the reception signal and the first reference signal to the formula (3) and generates the separated signal. Pulse compression is used in generation of the separated signal. The separator 112 sends the generated separated signal to the first reducer 113.

The first reducer 113 reduces the interference component of the separated signal (step S104). Specifically, because the interference component and the desired component are separated from each other on the time axis, the first reducer 113 corrects the value of data expressed as the interference component and thereby reduces the interference component. For example, among the bins of the separated signal, the first reducer 113 rewrites the value of the bin of the interference component to a minimum value (including a quasi-minimum value) preset by the first reducer 113, a noise level, zero, or the like. The first reducer 113 sends the separated signal in which the interference component is reduced to the restorer 114.

The restorer 114 uses the first reference signal sent in advance from the first reference signal generator 111 and thereby generates the restored signal (step S105). The restored signal includes the desired signal, and the interference signal is reduced compared to the reception signal. As expressed by the formula (4), the restorer 114 generates the restored signal by pulse decompression. The restorer 114 sends the restored signal to the output signal generator 116.

The output signal generator 116 uses the second reference signal sent from the second reference signal generator 115 and thereby generates the output signal from the restored signal (step S106). Pulse decompression is first performed by using the first reference signal, the restored signal is generated, the output signal is thereafter generated, and degradation of the S/N ratio of the output signal may thereby be inhibited. As expressed by the formula (5), the output signal generator 116 generates the output signal by pulse compression. The output signal generator 116 sends the output signal to the output device 106.

The output device 106 outputs the output signal sent from the output signal generator 116 (step S107). As described earlier, the output device 106 outputs the output signal to an arbitrary output destination.

The processor 110 checks whether or not a finishing command for finishing the action of the radar apparatus 100 is delivered (step S108). The finishing command is a command for finishing the action of the radar apparatus 100 in this flow. The finishing command is notified to the processor 110 by an input to the radar apparatus 100 by a user, acquisition of a signal including the finishing command by the radar apparatus 100, or the like. The finishing command may be a command for immediately finishing the action of the radar apparatus 100.

In a case where the finishing command is not delivered to the processor 110 (step S108: No), the flow returns to step S101. On the other hand, in a case where the finishing command is delivered to the processor 110 (step S108: Yes), the flow is finished, and the radar apparatus 100 finishes the action.

In the above, the radar apparatus 100 of this embodiment is described. The description of this embodiment is one example, and various modification examples may be implemented and executed. In the following, modification examples of this embodiment will be described.

First Modification Example

In this embodiment, a description is made about a case where the interference signal based on the pulse signal is the pulse signal received by the receiver 105 in a case where the antenna 103 is terminated; however, various different cases are possible. For example, the first reference signal generator 111 acquires a signal indicating the weather around the radar apparatus 100. A source of acquisition of the signal is an arbitrary source. In a case where the weather is fine weather and the elevation angle of the antenna 103 satisfies a condition, the first reference signal generator 111 commands the receiver 105 to send the reception signal at predetermined time after transmission of the pulse signal as the interference signal based on the pulse signal. Although a condition of the elevation angle of the antenna 103 is capable of being arbitrarily set, a reflected signal from a ground, a forest, or a building to be a component other than the interference signal has to be reduced. As one example, the condition of the elevation angle of the antenna 103 is a horizontal angle or greater. For example, the first reference signal generator 111 may acquire a signal indicating the temperature (atmospheric temperature) around the radar apparatus 100. The first reference signal generator 111 may apply temperature compensation to the first reference signal to be generated in accordance with the acquired temperature or may select a reference signal corresponding to the acquired temperature from a temperature table generated in advance and send the selected reference signal as the first reference signal to the separator 112.

In this case, the first reference signal generator 111 may not only generate the first reference signal in advance but also generate the first reference signal by acquiring the interference signal based on the pulse signal in accordance with a meteorological condition such as weather or a temperature and the elevation angle of the antenna. Accordingly, the first reference signal generator 111 may generate the first reference signal following the change in an environment around the radar apparatus 100.

Although not limited to this modification example, also in a case of the interference signal based on the pulse signal, the interference signal being described in this embodiment, the first reference signal generator 111 may generate the first reference signal by acquiring the interference signal based on the newest pulse signal in accordance with each preset time or each preset instruction.

Further, the interference signal based on the pulse signal may be estimated by the first reference signal generator 111. For example, the first reference signal generator 111 may accept the pulse signal from the pulse signal generator 101 and thereby estimate the interference signal based on the pulse signal. The first reference signal generator 111 may acquire in advance information about the pulse signal to be generated by the pulse signal generator 101 and thereby estimate the interference signal based on the pulse signal. In the same manner, the second reference signal generator 115 may acquire in advance information about the pulse signal to be generated by the pulse signal generator 101 and thereby generate the second reference signal or may generate the second reference signal by estimating the pulse signal.

Second Modification Example

The formula (2) to the formula (5) described in this embodiment are calculation formulas for performing pulse compression and pulse decompression with respect to the frequency. A portion of the formula (2) to the formula (5) may also be expressed with respect to the time axis. In the following, mathematical formulas of pulse compression with respect to the time axis will be described. The signal ($y_0(t)$) in a case where pulse compression using the first reference signal is performed for the interference signal ($x_0(t)$) based on the pulse signal in the formula (2) is expressed by the following formula (6) with respect to the time axis.

[Math. 13]

$$y_0(t) = \int_{-\infty}^{\infty} x_0(\tau) \cdot r_0^*(\tau-t) d\tau \quad (6)$$

In a case where the reception signal ($x(t)$) is separated into the desired component and the interference component by using the first reference signal ($r_0(t)$) expressed by the formula (1), the separated signal ($y_a(t)$) in which the desired component and the interference component are separated from each other on the time axis is expressed by a formula (7). A process of the following formula (7) is also referred to as "pulse compression".

[Math. 14]

$$y_a(t) = \int_{-\infty}^{\infty} x(\tau) \cdot r_0^*(\tau-t) d\tau \quad (7)$$

The output signal ($y(t)$) is generated from the restored signal ($x_b(t)$) by using the second reference signal. The output signal ($y(t)$) is expressed by the following formula (8). A process of the following formula (8) is also referred to as "pulse compression".

[Math. 15]

$$y(t) = \int_{-\infty}^{\infty} x_b(\tau) \cdot r^*(\tau-t) d\tau \quad (8)$$

As described above, pulse compression may be expressed not only with respect to the frequency but also with respect to the time axis.

Third Modification Example

In this embodiment, the first reducer 113 reduces the interference component of the separated signal by correcting the data expressing the interference component. In this embodiment, as illustrated in FIG. 2B, the first bin is set as the bin of the interference component, but a portion of the interference component may enter the bins of the desired component. FIGS. 5A to 5D illustrate a flow from the reception signal to the restored signal in a case where the interference component enters the desired component. As one example of this modification example, in FIG. 5B, the next bin to the bin of the interference component is a bin of the desired component which the interference component enters. The first reducer 113 acquires or estimates in advance information of a bin which the interference component possibly enters. The first reducer 113 corrects not only the bin of the interference component but also the bin which the interference component possibly enters. Accordingly, the interference component may further be reduced.

Note that the bin which the interference component possibly enters is close to the bin of the interference component. That is, the bin close to the bin of the interference component represents a bin of an observation target at a close distance from the radar apparatus 100. Because observation in a very close vicinity of the radar apparatus 100 may not be performed, correcting or deleting plural bins which the interference component possibly enters does not obstruct an analysis of data. For example, correcting or deleting bins corresponding to observation data about a range within approximately 150 m from the radar apparatus does not become a problem with an analysis of data.

Fourth Modification Example

Although a description is made about the radar apparatus as an example, this embodiment may also be applied to a wireless communication. The pulse signal described in this embodiment is applicable to a wireless signal used in wireless communication. In this case, the radar apparatus 100 described in this embodiment corresponds to a wireless communication device B transmitting a wireless signal "b" while receiving a wireless signal "a" from a wireless communication device A as a communication destination. The wireless communication device B receives the wireless signal "a" including the interference signal provided in accordance with the wireless signal "b" to be transmitted. This interference signal is an interference signal based on the wireless signal "b" and corresponds to the interference signal based on the pulse signal, the interference signal being described in this embodiment. Separation described in this embodiment into the desired signal and the interference signal (generation of the separated signal) is applicable to the wireless signal "a", and a method described in this embodiment is also applicable to reduction of the interference component included in the separated signal. A method described in this embodiment is also applicable to restoration from the separated signal in which the interference component is reduced to the restored signal. A method described in this embodiment is also applicable to generation of the output signal from the restored signal. The above creation of the separated signal, reduction of the interference component, restoration to the restored signal, and generation of the output signal are performed by a signal processing apparatus the same as the processor 110 of this embodiment.

Figure 6:
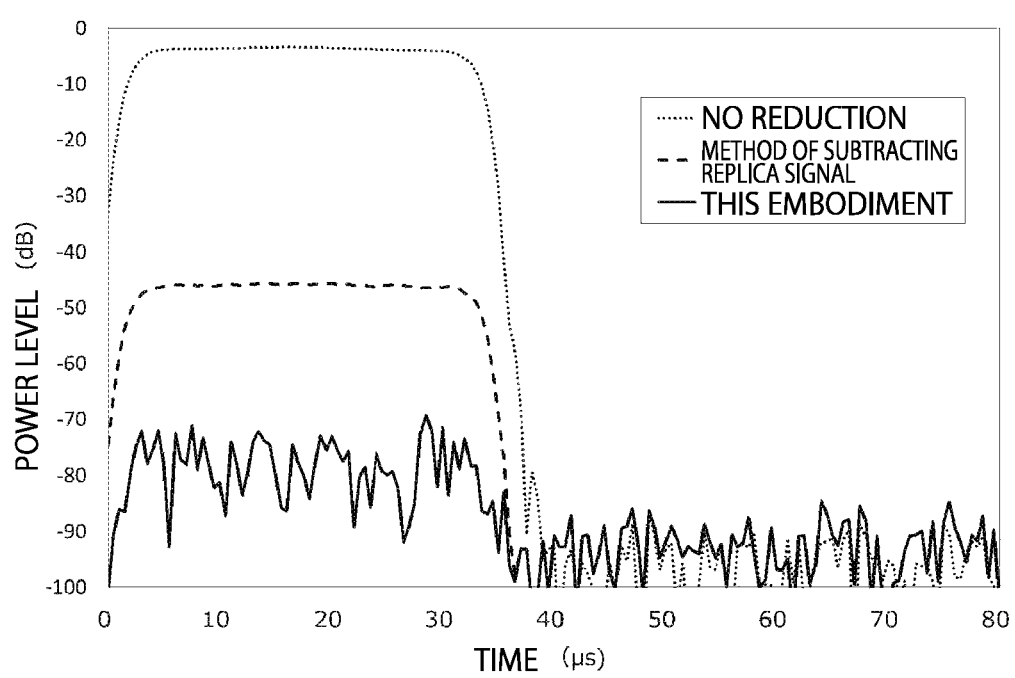
FIG. 6 is a diagram for comparing intensities of an interference signal among the first embodiment, a method of subtracting a replica signal, and a case with no reduction process.

In the above, the modification examples of the radar apparatus 100 are described. The radar apparatus 100 of this embodiment generates the separated signal in which the desired signal and interference signal included in the reception signal are separated from each other on the time axis. The interference component and desired component included in the separated signal are separated from each other on the time axis, and correction is thereby performed so as to reduce the data expressing the interference component. Accordingly, the interference with the reception signal may more largely be reduced than a method in which a replica signal of the transmission signal is generated and the replica signal of the transmission signal is subtracted from the reception signal. FIG. 6 illustrates the intensities of the interference signal in three cases of this embodiment, of the method of subtracting the replica signal of the transmission signal from the reception signal, and of no reduction. This embodiment is indicated by a solid line, the method of subtracting the replica signal of the transmission signal from the reception signal is indicated by a broken line, and the case with no reduction is indicated by a dotted line. Based on FIG. 6, this embodiment may more largely reduce the interference with the reception signal than the method of subtracting the replica signal of the transmission signal from the reception signal.

Second Embodiment

As interference with the reception signal, interference due to ground clutter is present other than interference due to the pulse signal that has already been transmitted and is described in the first embodiment. Ground clutter is a reflected wave of the pulse signal reflected by a still object that is not an observation target. Examples of this still object may include a ground, a forest, a mountain, a building, and so forth. This ground clutter is included in the interference signal. In the second embodiment, the interference with the reception signal is reduced by reducing interference in consideration of the ground clutter.

Figure 7:
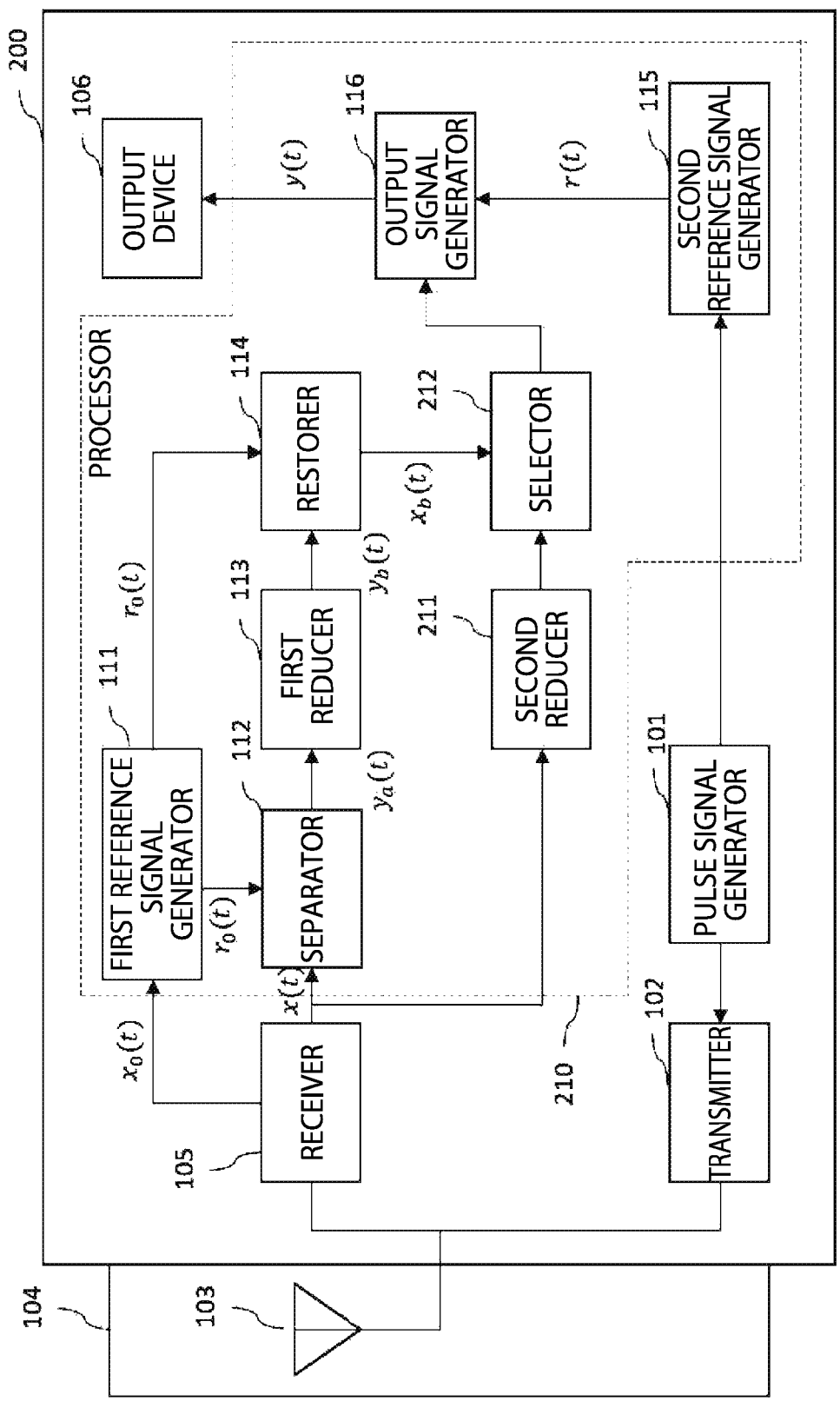
FIG. 7 is a configuration diagram illustrating a radar apparatus in a second embodiment.

FIG. 7 is a configuration diagram of a radar apparatus 200 in this embodiment. In the radar apparatus 200, the processor 110 as the constituent element of the radar apparatus 100 described in the first embodiment is changed to a processor 210. The processor 210 includes a second reducer 211 and a selector 212 in addition to the constituent elements included in the processor 110.

The same reference numerals are provided to the constituent elements described in the first embodiment, and a description thereof will be omitted. In the second embodiment, differences from the first embodiment will be described.

The receiver 105 sends the reception signal not only to the separator 112 but also to the second reducer 211. The second reducer 211 reduces the interference component due to the ground clutter (hereinafter also referred to as "ground clutter component") included in the reception signal. A specific reduction method of the ground clutter component will be described later. The second reducer 211 sends the reception signal in which the ground clutter component is reduced to the selector 212. The restorer 114 sends the generated restored signal not to the output signal generator 116 but to the second reducer 211.

The selector 212 selects one between the reception signal which is sent from the second reducer 211 and in which the ground clutter component is reduced and the restored signal sent from the restorer 114. The selected signal is sent to the output signal generator 116, and the output signal is generated based on the selected signal. A criterion for selection of the signal by the selector 212 is an arbitrary criterion. Examples of the criterion may include the S/N ratio of a signal, the elevation angle of the antenna 103, parameters about observation included in the reception signal and the restored signal, and so forth. As for the elevation angle of the antenna 103, in a case where the elevation angle is smaller (a case where the antenna 103 is directed toward the ground), an influence by the interference due to the ground clutter becomes larger. As one example, the selector 212 may acquire information about the elevation angle of the antenna 103 and may select the signal sent from the second reducer 211 in a case where the elevation angle of the antenna 103 is smaller than a preset elevation angle but may select the restored signal sent from the restorer 114 in a case where the elevation angle of the antenna 103 is the preset elevation angle or greater.

Figures 8A, 8B:
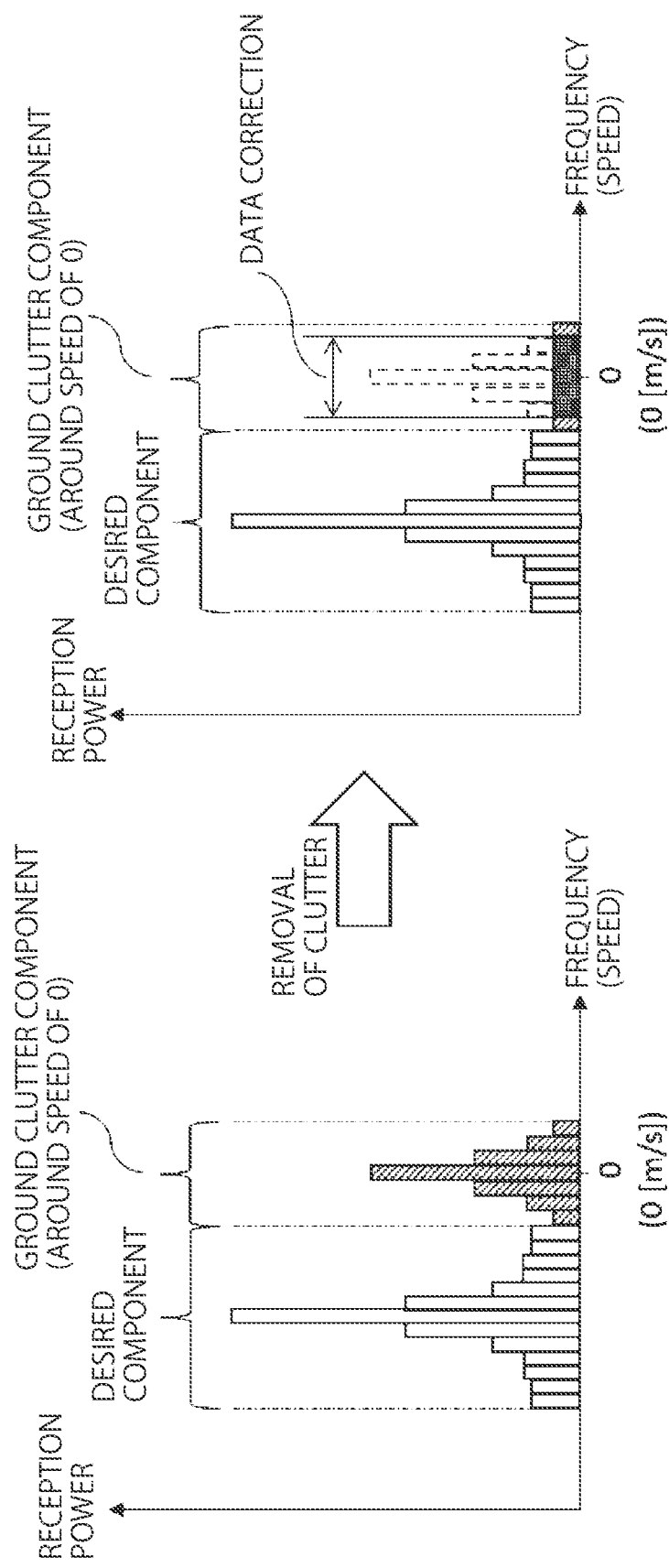
FIGS. 8A and 8B are diagrams explaining reduction of a ground clutter component by using a spectral analysis by FFT.

Reduction of the ground clutter component included in the reception signal in the second reducer 211 will be described by using FIGS. 8A and 8B. The second reducer 211 divides the reception signal sent from the receiver 105 into hits (each of those represents the time from transmission of a transmission pulse to reception of the reception signal) with respect to the distances to observation targets, arranges data obtained by the hits on the time axis in accordance with the time differences among the hits, and performs a spectral analysis by fast Fourier transform (FFT). The results are illustrated in FIG. 8A. FIG. 8A illustrates a speed of an object observed by the radar apparatus 200 as a frequency on the horizontal axis and illustrates a reception power of the reception signal on the vertical axis. The FFT of the reception signal includes the desired component and the ground clutter component as the interference component. The ground clutter component is distributed around a speed of 0 m/s. As illustrated in FIG. 8B, the second reducer 211 corrects data in a preset range from a speed of 0 m/s. For example, the second reducer 211 rewrites the value of data expressing the ground clutter component to a minimum value (including a quasi-minimum value) preset by the second reducer 211, a noise level, zero, or the like. Accordingly, the second reducer 211 reduces the interference due to the ground clutter in the interference included in the reception signal.

Note that the second reducer 211 reduces the ground clutter component, and interference due to the pulse signal transmitted by the transmitter 102 may thereby be reduced. Further, a range around a speed of 0/m in which the ground clutter component is mainly positioned may include a portion of the desired component. In a case where the second reducer 211 rewrites the value of data expressing the ground clutter component to the minimum value, the desired component around a speed of 0 m/s is possibly reduced. Thus, the second reducer 211 may correct the ground clutter component to a preset component. For example, the second reducer 211 may estimate in advance the desired component around a speed of 0 m/s and correct the ground clutter component to the estimated value of this desired component. Accordingly, the second reducer 211 may reduce the interference due to the ground clutter while inhibiting an influence on the desired component.

Figure 9:
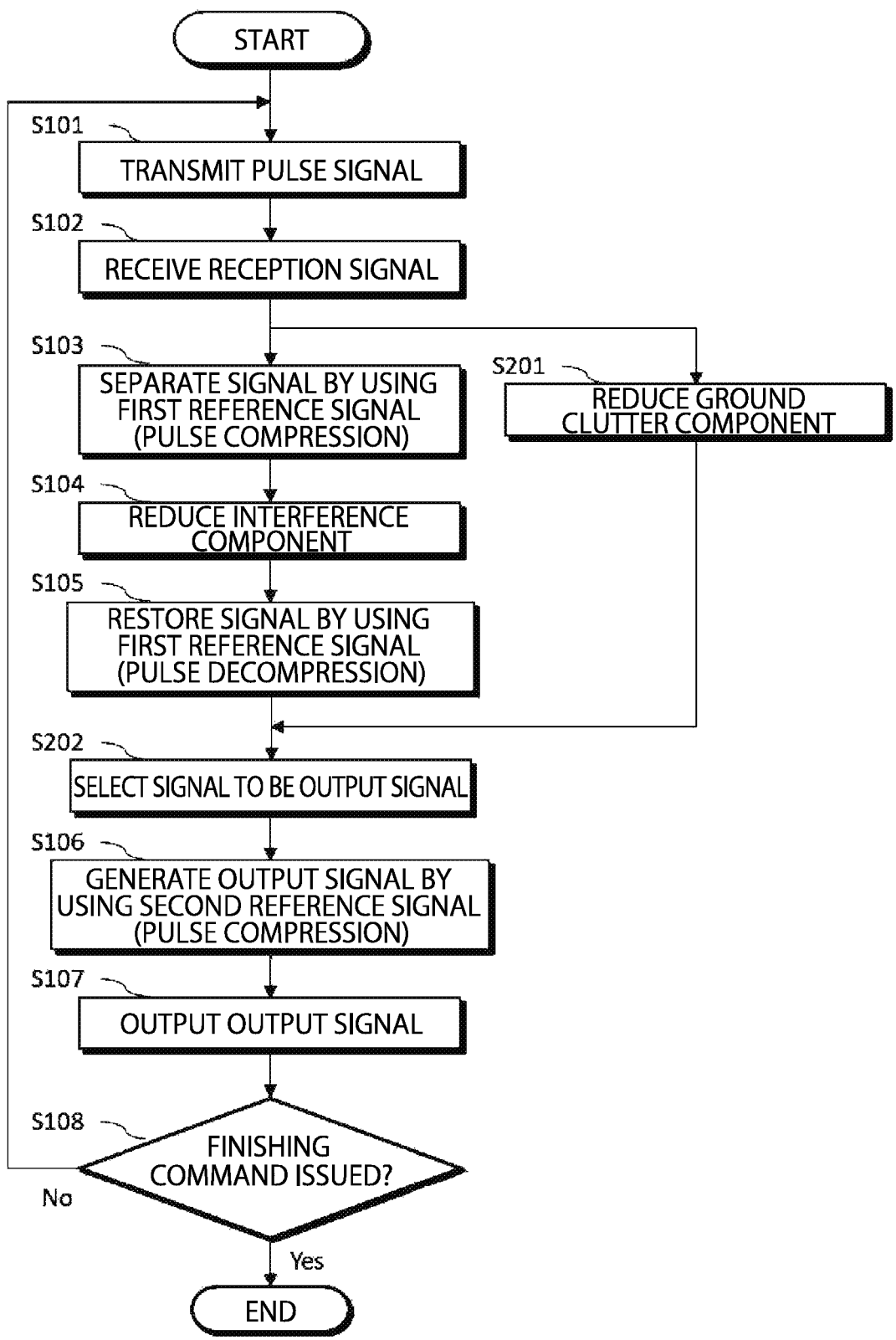
FIG. 9 is a flowchart of the radar apparatus in the second embodiment.

In the above, a description is made about reduction of the interference component due to the ground clutter included in the reception signal in the second reducer 211. An action of the radar apparatus 200 in this embodiment will be described by using FIG. 9. Because the radar apparatus 200 is similar to the radar apparatus 100, a description will be made mainly about differences from the radar apparatus 100 described in the first embodiment.

After step S102, the second reducer 211 reduces the ground clutter component from the reception signal as described above (step S201). This step S201 is performed in parallel with steps S103 to S105 described in the first embodiment. The second reducer 211 sends the reception signal in which the ground clutter component is reduced to the selector 212. In step S105, the restorer 114 sends the generated restored signal to the selector 212.

The selector 212 selects one between the reception signal which is sent from the second reducer 211 and in which the ground clutter component is reduced and the restored signal sent from the restorer 114 (step S202). The selector 212 may select the signal by applying an arbitrary selection criterion as described above. The signal selected by the selector 212 is sent to the output signal generator 116, and the output signal is generated based on the selected signal.

In the above, the radar apparatus 200 of this embodiment is described. The description of this embodiment is one example, and various modification examples may be implemented and executed. For example, the modification examples described in the first embodiment are applicable to this embodiment. In the following, modification examples of this embodiment will be described.

First Modification Example

In this embodiment, the second reducer 211 corrects and reduces the ground clutter component by performing the spectral analysis by FFT. The second reducer 211 may reduce the ground clutter component by another method. For example, the radar apparatus 200 performs transmission of the pulse signal to the same observation target plural times. Signal processing is performed for plural reception signals received in response to the transmission of the pulse signal performed plural times, and the second reducer 211 may thereby reduce the ground clutter component. As one example of the signal processing, the second reducer 211 may use a moving target indicator (MTI) process.

Figure 10:
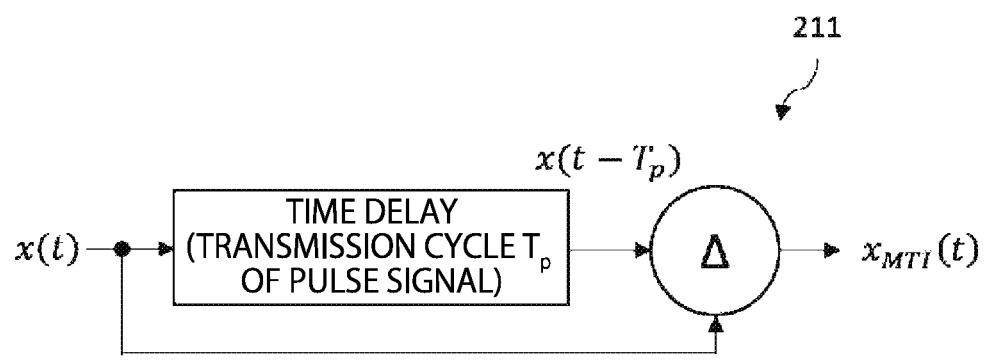
FIG. 10 is a diagram explaining reduction of the ground clutter component in a modification example.

One example of this MTI process is explained in FIG. 10. FIG. 10 illustrates the second reducer 211 to which one example of the MTI process is applied. The reception signal is sent to the second reducer 211 in each transmission cycle $T_p$ of the pulse signal. That is, plural reception signals (x(t), x(t−$T_p$)), ... x(t−N$T_p$): N is an integer of two or greater) are sent to the second reducer 211. The second reducer 211 performs subtraction between temporally neighboring reception signals and thereby reduces the ground clutter component from the reception signal. For example, in a case where the reception signal x(t) is sent, the second reducer 211 subtracts a reception signal x(t−$T_p$) sent previously from the reception signal x(t) (a signal resulting from the subtraction will also be referred to as "difference signal $x_{MTI}$"). This difference signal $x_{MTI}$(t) is expressed by a formula (9).

[Math. 16]

$$x_{MTI}(t)=x(t)-x(t-T_p) \quad (9)$$

The second reducer 211 sends the difference signal as the reception signal in which the ground clutter component is reduced to the selector 212. Note that in FIG. 10, a subtraction process between two reception signals is performed once, but the same process may be provided plural times. As the number of this process increases, the ground clutter component may be reduced more.

Second Modification Example

Figure 11:
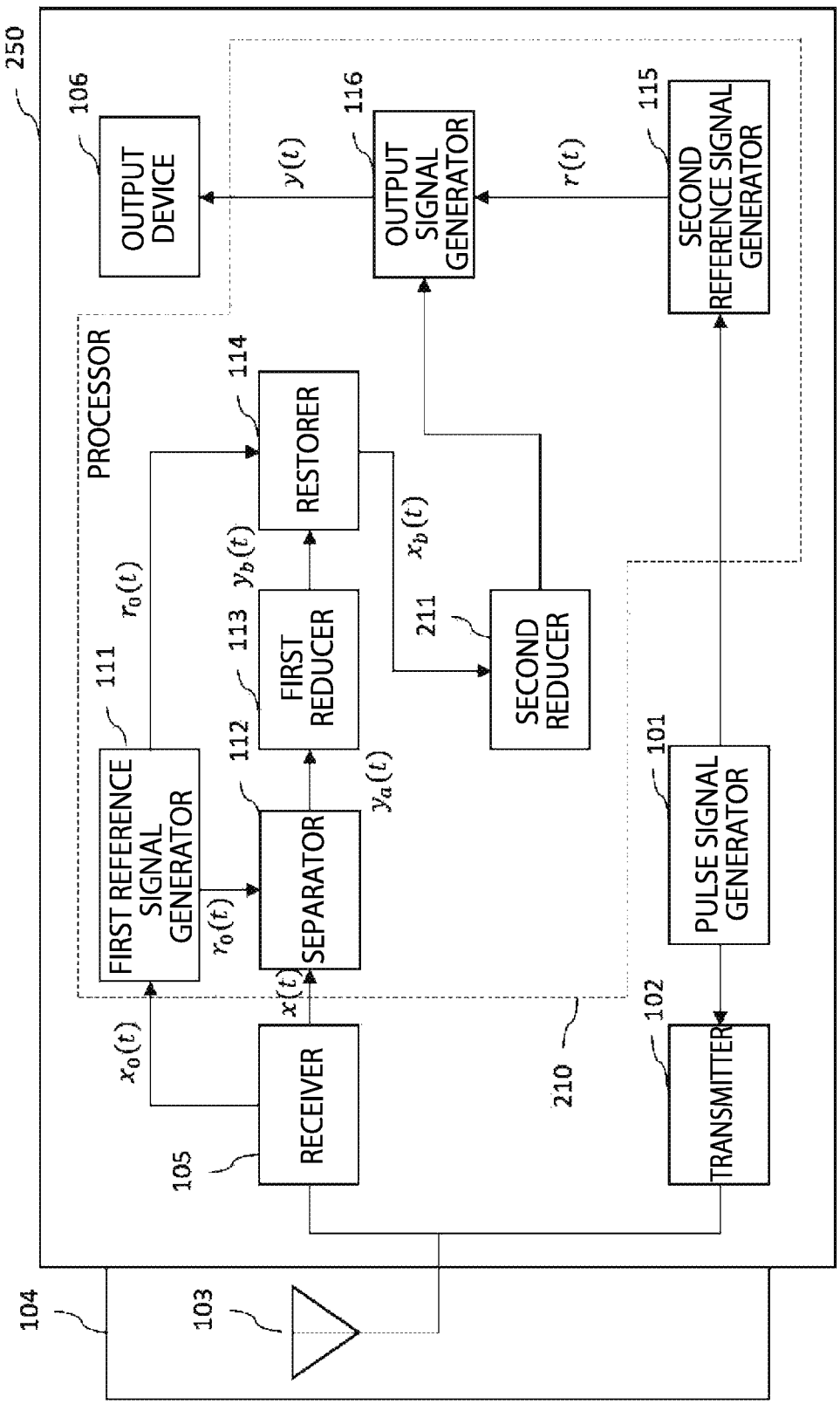
FIG. 11 is a configuration diagram illustrating a radar apparatus applicable to the second embodiment.

This embodiment is described on the assumption that processes from reception of the reception signal to generation of the restored signal (steps S103 to S105) and a process of reducing the ground clutter component (step S201) are performed in parallel; however, those processes are not limited to parallel processing. For example, those processes may be performed in series. FIG. 11 illustrates a configuration diagram of such a radar apparatus 250. The radar apparatus 250 is an apparatus in which the radar apparatus 100 described in the first embodiment further includes the second reducer 211 described in the second embodiment. The restorer 114 sends the generated restored signal to the second reducer 211, and the second reducer 211 reduces the ground clutter component of the restored signal. The second reducer 211 sends the restored signal in which the ground clutter component is reduced to the output signal generator 116. The output signal generator 116 uses the second reference signal and thereby generates the output signal from the restored signal in which the ground clutter component is reduced.

Figure 12:
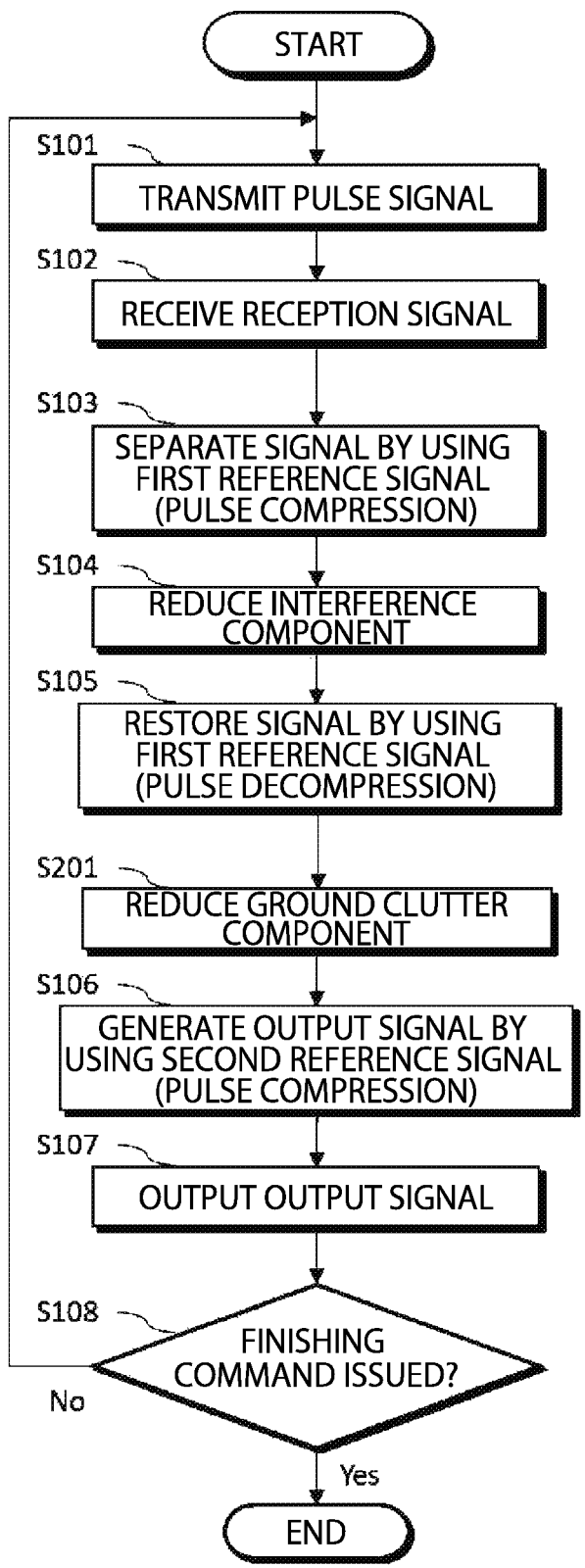
FIG. 12 is a flowchart of the radar apparatus applicable to the second embodiment.

An action of the radar apparatus 250 of this modification example will be described by using FIG. 12. The process of reducing the ground clutter component (step S201) is interposed between step S105 and S106. In step S201, a target of reduction of the ground clutter component by the second reducer 211 is the restored signal. A method described in the second embodiment is applicable as a method of reducing the ground clutter component.

As described above, the radar apparatus 250 reduces the ground clutter component of the restored signal and may thereby further reduce the interference component.

In the above, the modification examples of the radar apparatus 200 are described. The radar apparatus 200 of this embodiment reduces the ground clutter component as the interference component. In a case where the radar apparatus 200 performs processes of generating the restored signal and of reducing the ground clutter component in parallel, the radar apparatus 200 may generate the output signal from the signal conforming to a selection criterion between the restored signal and the reception signal in which the ground clutter component is reduced. In a case where the radar apparatus 200 performs the processes of generating the restored signal and of reducing the ground clutter component in series, the radar apparatus 200 may further reduce the interference component of the restored signal.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electronic apparatus comprising:
   a receiver to receive a reception signal including a first signal as a pulse signal reflected by an observation target and an interference signal provided corresponding to the pulse signal; and
   a processor configured to
      generates a first reference signal from an interference signal based a pulse signal obtained from the receiver based on a first pulse signal transmitted before the pulse signal,
      separate the reception signal, on a time axis, into a first component corresponding to the first signal and an interference component corresponding to the interference signal, by using the first reference signal,
      generate a separated signal including separated the first component and separated the interference component, and
      reduce the interference component.

2. The electronic apparatus according to claim 1, wherein the interference signal based on the pulse signal is a signal resulting from sneaking of the pulse signal in the electronic apparatus and obtained from the receiver.

3. The electronic apparatus according to claim 1, wherein the processor performs correction so as to reduce data included in the separated signal and indicating the interference component.

4. The electronic apparatus according to claim 3, wherein the processor reduces the interference component by correcting a value of the data to at least one of zero, a noise level, and a minimum value capable of being set.

5. The electronic apparatus according to claim 1, further comprising
   a transmitter to transmit the pulse signal.

6. The electronic apparatus according to claim 5, further comprising
   an antenna to radiate the pulse signal sent from the transmitter, receive the reception signal, and send the reception signal to the receiver, wherein in a case where the antenna is terminated, the processor generates the first reference signal from a signal obtained from the reception signal based on the transmitted pulse signal.

7. The electronic apparatus according to claim 5, further comprising
an antenna configured to radiate the pulse signal sent from the transmitter, receive the reception signal, and send the reception signal to the receiver, wherein
the processor acquires a second signal indicating present weather in the electronic apparatus and
generates the first reference signal from a signal obtained from the receiver based on the transmitted pulse signal based on the second signal and an elevation angle of the antenna.

8. The electronic apparatus according to claim 7, wherein
the processor transforms the separated signal to the restored signal by performing Fourier transform of the separated signal, multiplying a result of the Fourier transform by a reciprocal of a complex conjugate of a result of Fourier transform of the first reference signal, and performing inverse Fourier transform of a result of the multiplication.

9. The electronic apparatus according to claim 1, wherein
the processor transforms the separated signal in which the interference component is reduced to a restored signal including the first signal by using the first reference signal.

10. The electronic apparatus according to claim 9, wherein
the processor generates a second reference signal from the pulse signal and
transforms the restored signal to an output signal by using the second reference signal, and
the electronic apparatus further includes an output device to output the output signal.

11. The electronic apparatus according to claim 9, wherein
the interference signal includes a second interference component due to ground clutter, and
the processor reduces the second interference component from the restored signal.

12. The electronic apparatus according to claim 9, wherein
the interference signal includes a second interference component due to ground clutter, and
the processor reduces the second interference component from the reception signal and
selects either one of the reception signal in which the second interference component is reduced and the restored signal.

13. The electronic apparatus according to claim 1, wherein
a data length included in the reception signal is two times or longer a data length included in the pulse signal.

14. The electronic apparatus according to claim 1, wherein
the processor generates the first reference signal by performing Fourier transform of the interference signal based on the pulse signal, obtaining a reciprocal of a complex conjugate of a result of the Fourier transform, and performing inverse Fourier transform of the reciprocal.

15. An electronic apparatus,
the electronic apparatus being used in a wireless communication device configured to transmit and receive a wireless signal, the signal processing apparatus:
acquiring a reception signal including a first signal transmitted by a communication destination and an interference signal provided corresponding to a transmission signal of the wireless communication device;
generating a first reference signal from an interference signal based a pulse signal obtained from the receiver based on a first pulse signal transmitted before the pulse signal;
separating the reception signal, on a time axis, into a first component corresponding to the first signal and an interference component corresponding to the interference signal by using the first reference signal;
generating a separated signal including separated the first component and separated the interference component, and
reducing the interference component.

16. A method comprising:
receiving a reception signal including a first signal as a pulse signal reflected by an observation target and an interference signal provided corresponding to the pulse signal;
generating a first reference signal from an interference signal based a pulse signal obtained from the receiver based on a first pulse signal transmitted before the pulse signal;
separating the reception signal, on a time axis, into a first component corresponding to the first signal and an interference component corresponding to the interference signal by using the first reference signal;
generating a separated signal including separated the first component and separated the interference component; and
reducing the interference component.

* * * * *

UNITED STATES PATENT AND TRADEMARK OFFICE
CERTIFICATE OF CORRECTION

| | |
|---|---|
| PATENT NO. | : 11,265,030 B2 |
| APPLICATION NO. | : 17/010867 |
| DATED | : March 1, 2022 |
| INVENTOR(S) | : Koichiro Gomi et al. |

It is certified that error appears in the above-identified patent and that said Letters Patent is hereby corrected as shown below:

On the Title Page

Item (57), Line 3 of ABSTRACT, "a method that reduce interference" should read --a method that reduces interference--.

In the Claims

Claim 1, Column 16, Line 37, "based a pulse signal" should read --based on a pulse signal--.

Claim 1, Column 16, Lines 44-46, "generating a separated signal including separated the first component and separated the interference component" should read --generating a separated signal including separating the first component and separating the interference component--.

Claim 13, Column 18, Lines 3-4, "a data length included in the reception signal is two times or longer a data length" should read --a data length included in the reception signal is two times or longer than a data length--.

Claim 15, Column 18, Line 22, "based a pulse signal" should read --based on a pulse signal--.

Claim 16, Column 18, Lines 29-30, "generating a separated signal including separated the first component and separated the interference component" should read --generating a separated signal including separating the first component and separating the interference component--.

Claim 16, Column 18, Line 39, "based a pulse signal" should read --based on a pulse signal--.

Claim 16, Column 18, Lines 46-47, "generating a separated signal including separated the first component and separated the interference component" should read --generating a separated signal including separating the first component and separating the interference component--.

Signed and Sealed this
Sixteenth Day of May, 2023

*Katherine Kelly Vidal*

Katherine Kelly Vidal
*Director of the United States Patent and Trademark Office*